United States Patent
Griffin et al.

(10) Patent No.: US 8,723,890 B2
(45) Date of Patent: May 13, 2014

(54) HANDHELD ELECTRONIC DEVICE HAVING SLIDING DISPLAY AND POSITION CONFIGURABLE CAMERA

(75) Inventors: Jason Tyler Griffin, Kitchener (CA); Laura Mahan, Kanata (CA)

(73) Assignee: BlackBerry Limited, Waterloo (CA)

( * ) Notice: Subject to any disclaimer, the term of this patent is extended or adjusted under 35 U.S.C. 154(b) by 636 days.

(21) Appl. No.: 12/977,242

(22) Filed: Dec. 23, 2010

(65) Prior Publication Data

US 2012/0162263 A1    Jun. 28, 2012

(51) Int. Cl.
G09G 5/00 (2006.01)
(52) U.S. Cl.
USPC .......................... 345/649; 345/652
(58) Field of Classification Search
USPC ................. 345/649–659
See application file for complete search history.

(56) References Cited

U.S. PATENT DOCUMENTS

| | | | |
|---|---|---|---|
| 5,734,875 A * | 3/1998 | Cheng | 345/568 |
| 5,900,909 A | 5/1999 | Parulski et al. | |
| 6,243,595 B1 | 6/2001 | Lee et al. | |
| 6,332,084 B1 | 12/2001 | Shaanan et al. | |
| 6,850,226 B2 | 2/2005 | Finke-Anlauff | |
| 6,864,993 B1 * | 3/2005 | Roberts et al. | 358/1.9 |
| 6,963,756 B2 | 11/2005 | Lubowicki et al. | |
| 7,064,769 B2 * | 6/2006 | Speigle et al. | 345/589 |
| 7,187,363 B2 * | 3/2007 | Nguyen et al. | 345/168 |
| 7,388,578 B2 | 6/2008 | Tao | |
| 7,400,345 B2 | 7/2008 | Cok | |
| 7,580,736 B2 | 8/2009 | Ronkko et al. | |
| 7,692,667 B2 | 4/2010 | Nguyen et al. | |
| 7,844,301 B2 * | 11/2010 | Lee et al. | 455/566 |
| 8,165,647 B2 | 4/2012 | Cho et al. | |
| 2002/0006813 A1 | 1/2002 | Lubowicki et al. | |
| 2004/0032382 A1 | 2/2004 | Cok et al. | |

(Continued)

FOREIGN PATENT DOCUMENTS

| EP | 1603311 A2 | 12/2005 |
|---|---|---|
| EP | 1858236 A1 | 11/2007 |

(Continued)

OTHER PUBLICATIONS

Extended European Search Report, EP10196722.2, dated Apr. 6, 2011, 7 pages.

(Continued)

*Primary Examiner* — Xiao M. Wu
*Assistant Examiner* — Charles Tseng
(74) *Attorney, Agent, or Firm* — Ridout & Maybee LLP

(57) ABSTRACT

A handheld electronic device having a movable display screen is used to capture image data. The movable display screen is movable between a first position and a second position, wherein in the first position a first portion of the display screen is hidden from view and a second portion of the display screen is viewable, and in the second position the first portion and the second portion of the display screen are viewable, the handheld electronic device having an image sensor, an orientation sensor for sensing an orientation of the handheld electronic device, and at least one position sensor for sensing a position of the display screen. Device orientation information is received from the orientation sensor, display screen position information is received from the position sensor and image data is received from the image sensor representing an image. An image orientation for the image is determined in dependence on both the display screen position information and the device orientation information.

19 Claims, 11 Drawing Sheets

(56) References Cited

U.S. PATENT DOCUMENTS

| | | |
|---|---|---|
| 2004/0070558 A1 | 4/2004 | Cok et al. |
| 2004/0150590 A1 | 8/2004 | Cok et al. |
| 2004/0229662 A1 | 11/2004 | Chadha |
| 2005/0054397 A1 | 3/2005 | Kim et al. |
| 2005/0090298 A1 | 4/2005 | Park et al. |
| 2005/0096082 A1 | 5/2005 | Chang |
| 2005/0233785 A1 | 10/2005 | Park et al. |
| 2005/0266897 A1 | 12/2005 | Ahn et al. |
| 2007/0024576 A1 | 2/2007 | Hassan |
| 2007/0093281 A1 | 4/2007 | Park et al. |
| 2007/0115255 A1 | 5/2007 | Pan |
| 2007/0177404 A1 | 8/2007 | Daniel et al. |
| 2007/0247798 A1 | 10/2007 | Scott |
| 2007/0265031 A1 | 11/2007 | Koizumi et al. |
| 2007/0285401 A1 | 12/2007 | Ohki et al. |
| 2007/0287504 A1 | 12/2007 | Lim et al. |
| 2008/0144265 A1 | 6/2008 | Aoki |
| 2008/0207273 A1 | 8/2008 | Huo |
| 2008/0226970 A1 | 9/2008 | Kim et al. |
| 2008/0268901 A1 | 10/2008 | Miramontes |
| 2009/0011798 A1 | 1/2009 | Yamada |
| 2009/0042609 A1 | 2/2009 | Bloebaum |
| 2009/0075692 A1 | 3/2009 | Park et al. |
| 2009/0154082 A1 | 6/2009 | Nurmi et al. |
| 2009/0156264 A1 | 6/2009 | Cho et al. |
| 2009/0174628 A1 | 7/2009 | Wang et al. |
| 2009/0195499 A1 | 8/2009 | Griffin |
| 2009/0207184 A1 | 8/2009 | Laine et al. |
| 2009/0231785 A1 | 9/2009 | Li et al. |
| 2010/0093409 A1 | 4/2010 | Jokinen et al. |

FOREIGN PATENT DOCUMENTS

| | | |
|---|---|---|
| EP | 1931118 A2 | 6/2008 |
| EP | 1944949 A1 | 7/2008 |
| GB | 2384939 A | 8/2003 |
| GB | 2417851 A | 3/2006 |
| WO | 03030497 A2 | 4/2003 |
| WO | 2008074358 A1 | 6/2008 |
| WO | 2010044902 A1 | 4/2010 |

OTHER PUBLICATIONS

European Patent Office, "Extended European Search Report" for European Patent Application No. 10173174.3 dated Dec. 14, 2010.
Mougeot, Charles—Canadian Intellectual Property Office, "Examiner Requisition" for Canadian Patent Application No. 2,736,698 dated Oct. 11, 2013.
Morales Fernandez, Benjamin—United States Patent and Trademark Office, "Office Action" for U.S. Appl. No. 12/858,528 dated Oct. 16, 2013.
JP 20030298694 A—Abstract—Portable Electronic Device, 2004.
U.S. Appl. No. 12/858,528, filed Aug. 18, 2010.

* cited by examiner

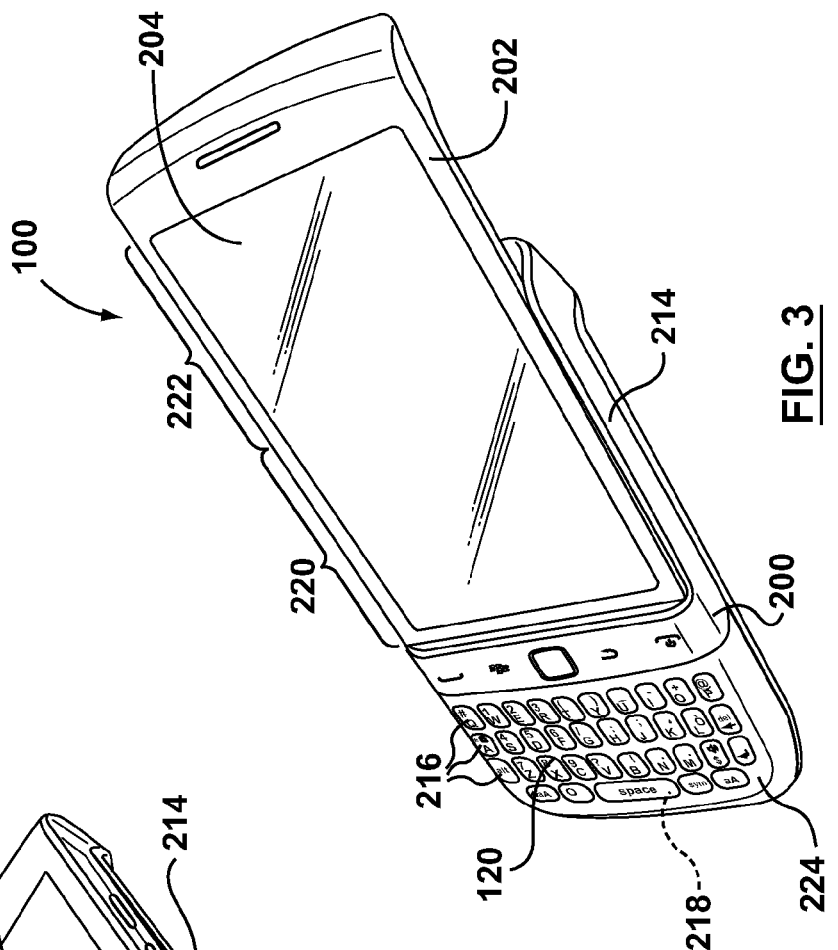
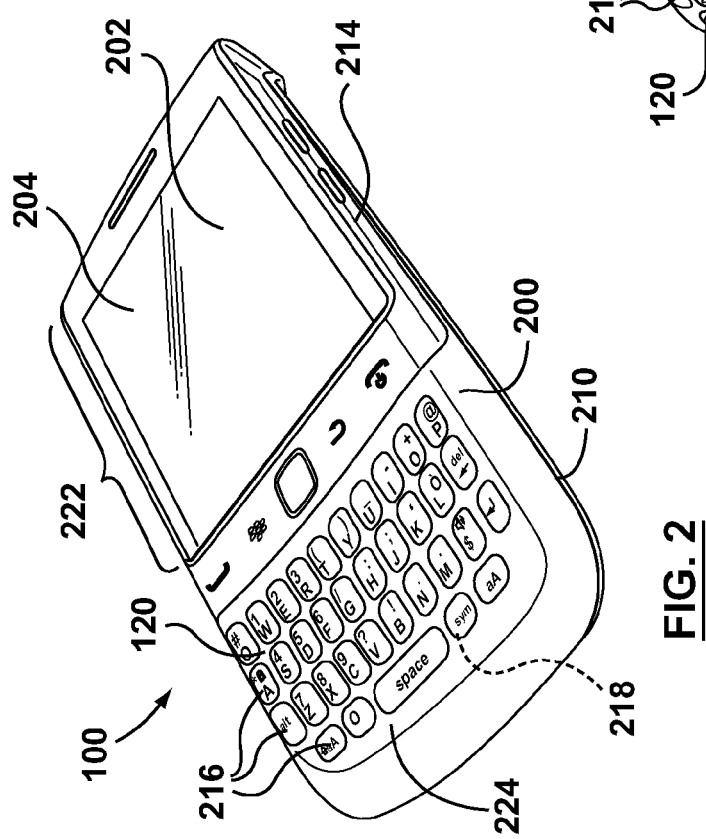

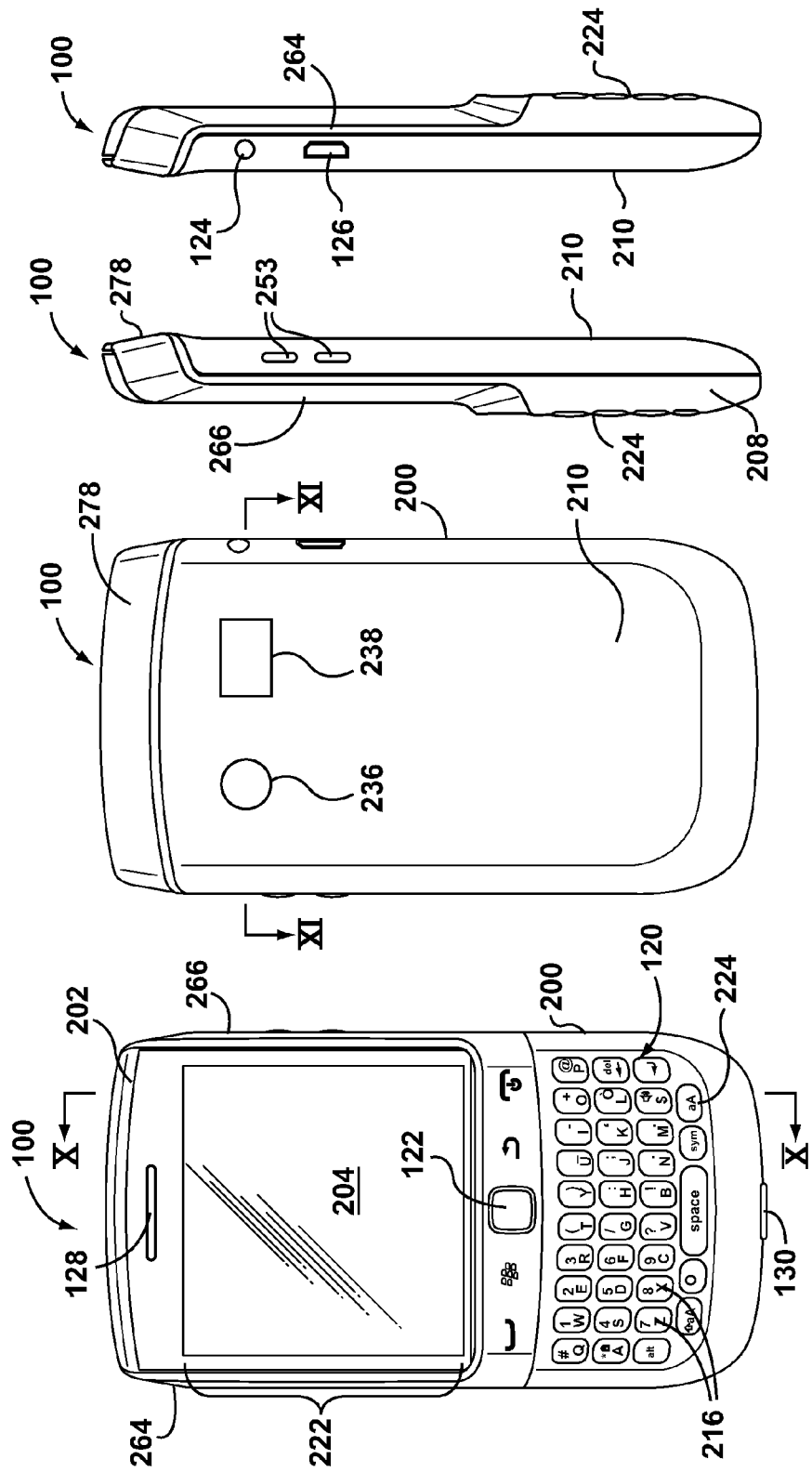

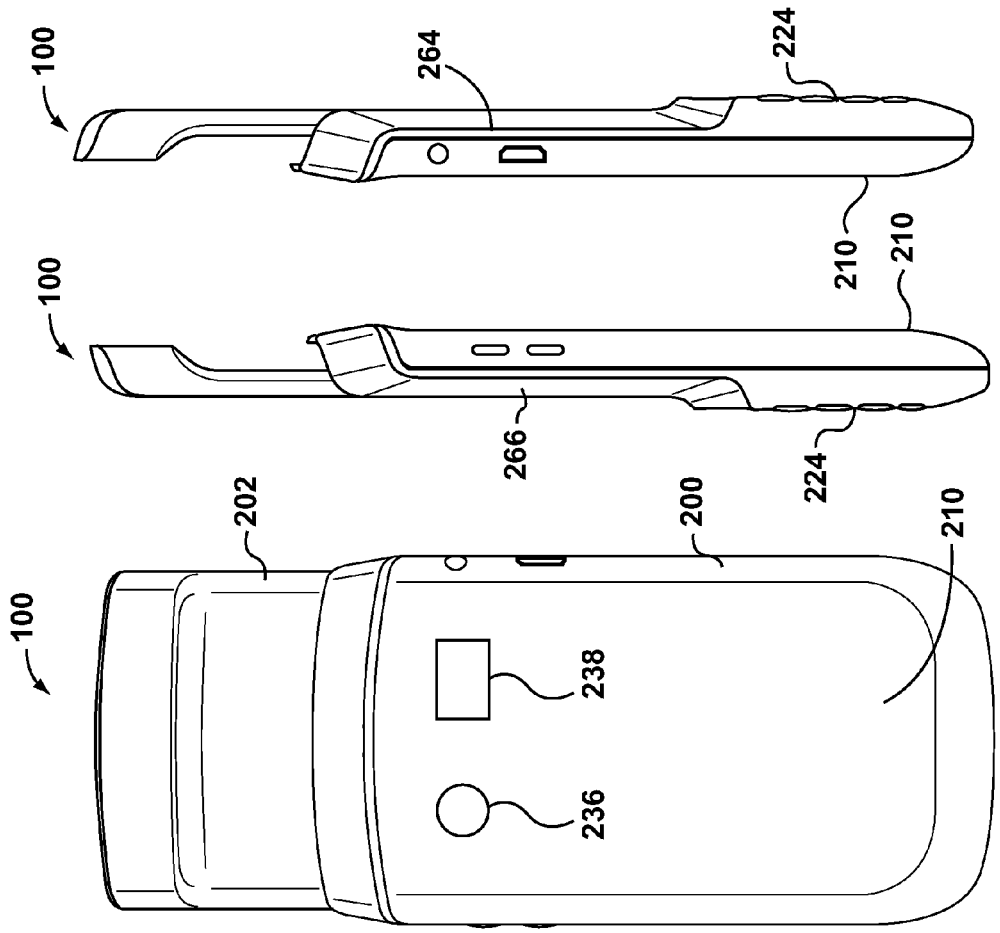
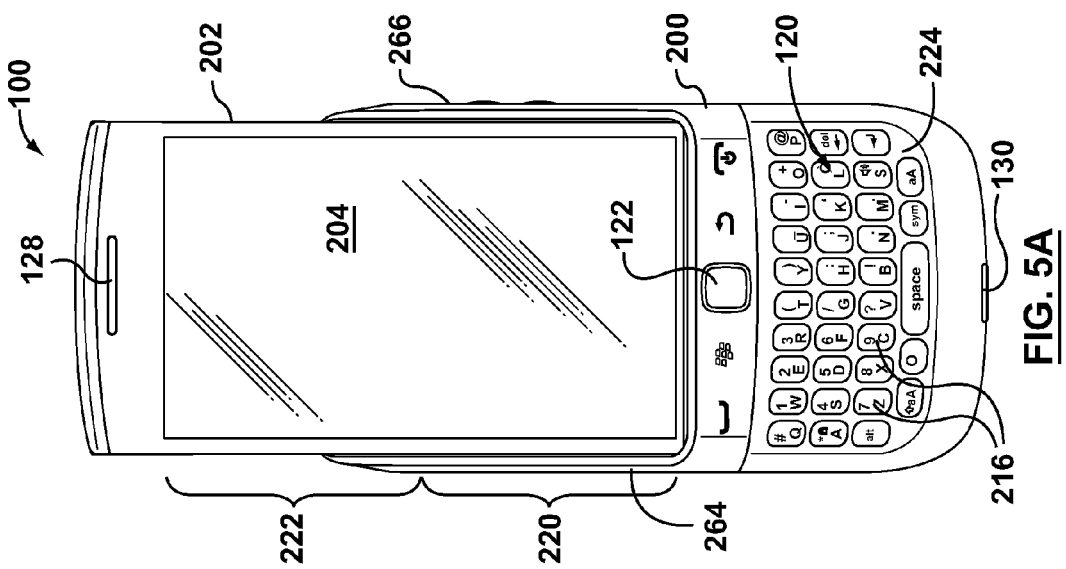
FIG. 5A  FIG. 5B  FIG. 5C  FIG. 5D

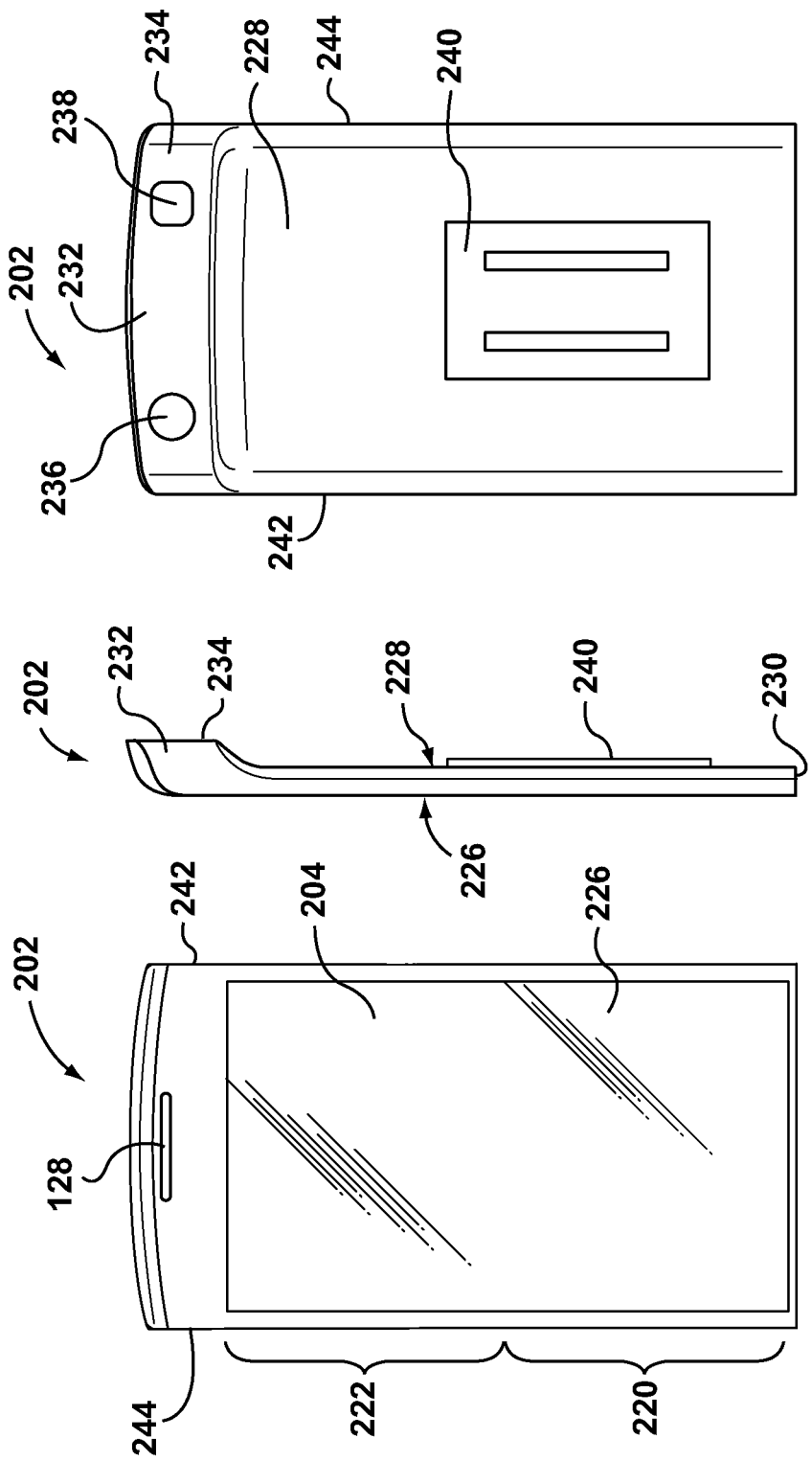

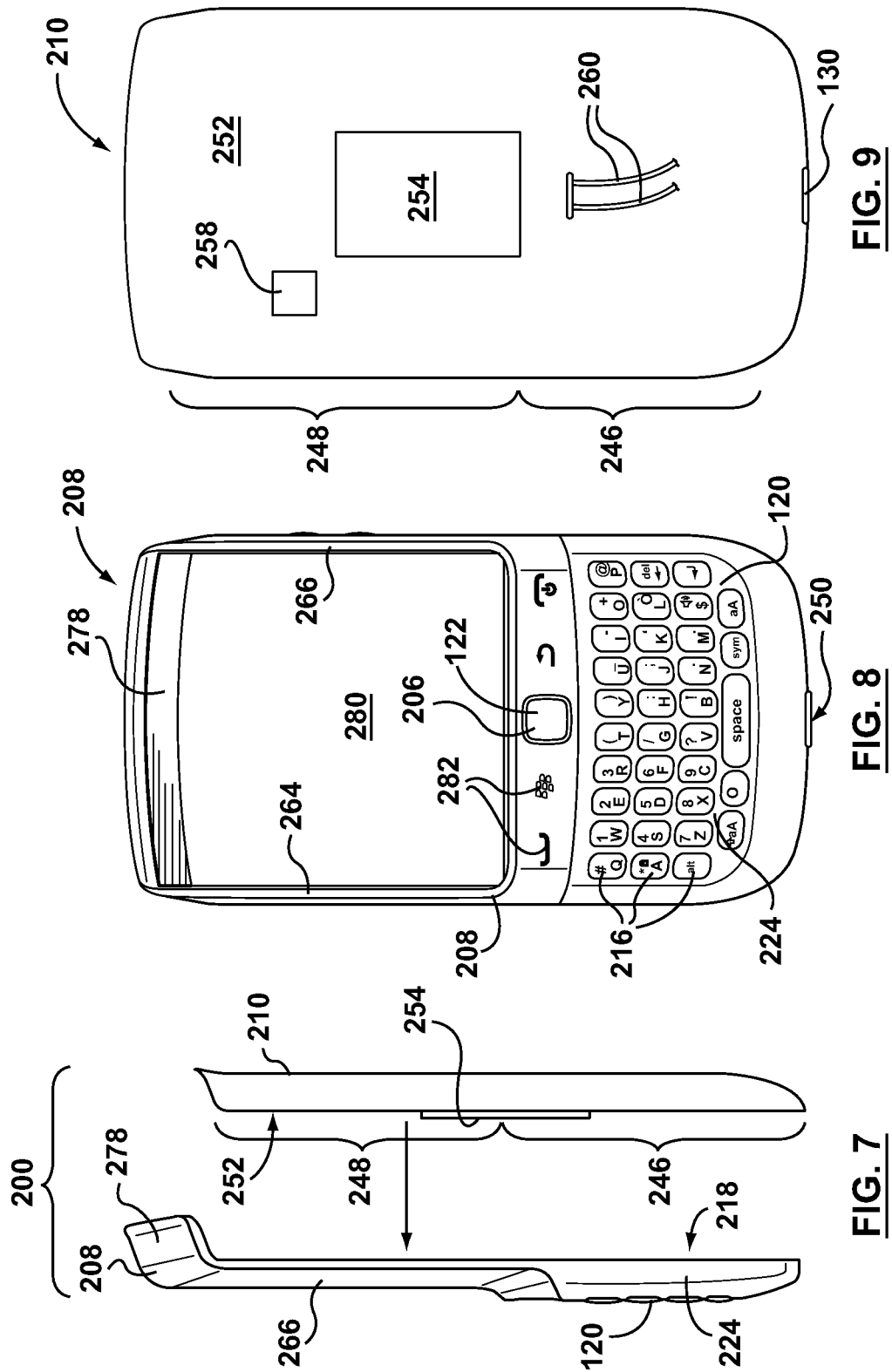

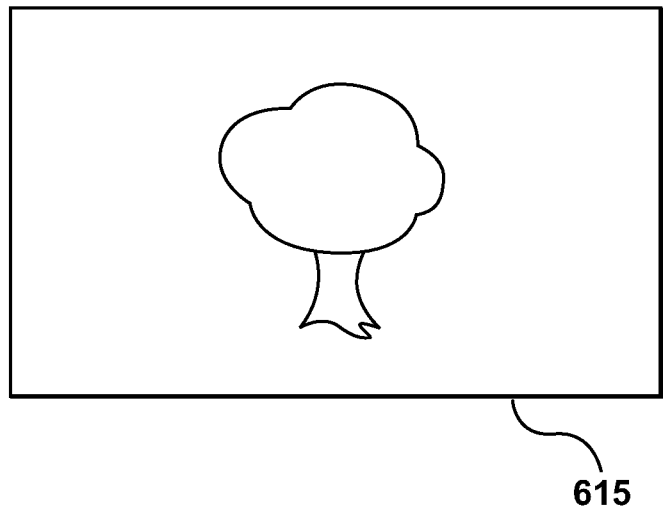
615
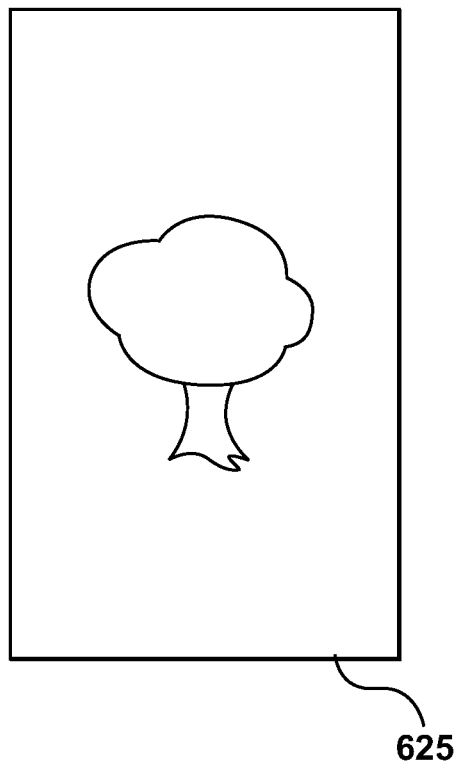
625
FIG. 15

HANDHELD ELECTRONIC DEVICE HAVING SLIDING DISPLAY AND POSITION CONFIGURABLE CAMERA

FIELD OF TECHNOLOGY

The present disclosure relates to electronic devices, including handheld electronic communication devices having a sliding display and a camera.

BACKGROUND

Electronic devices, including handheld electronic communication devices, have gained widespread use and may provide a variety of functions including, for example, telephonic, electronic text messaging, personal information manager (PIM) application functions, mobile web browsing, and audio and video playback, among other things. Some electronic devices additionally include hardware for capturing images and can capture images in portrait or landscape orientations depending on camera orientation.

BRIEF DESCRIPTION OF THE DRAWINGS

Embodiments of the present disclosure will now be described, by way of example only, with reference to the attached Figures, wherein:

FIG. 2 is a perspective view of an example of a handheld electronic communication device including a display assembly in a retracted position;

FIG. 3 is a perspective view of the handheld electronic communication device of FIG. 2 showing the display assembly in an extended position;

FIG. 4A is a front view of the handheld electronic communication device of FIG. 2 showing the display assembly in the retracted position;

FIG. 4B is a back view of the handheld electronic communication device of FIG. 2 showing the display assembly in the retracted position;

FIG. 4C is a right side view of the handheld electronic communication device of FIG. 2 showing the display assembly in the retracted position;

FIG. 4D is a left side view of the handheld electronic communication device of FIG. 2 showing the display assembly in the retracted position;

FIG. 5A is a front view of the handheld electronic communication device of FIG. 2 showing the display assembly in the extended position;

FIG. 5B is a back view of the handheld electronic communication device of FIG. 2 showing the display assembly in the extended position;

FIG. 5C is a right side view of the handheld electronic communication device of FIG. 2 showing the display assembly in the extended position;

FIG. 5D is a left side view of the handheld electronic communication device of FIG. 2 showing the display assembly in the extended position;

FIG. 6A is a front view of a display assembly of the handheld electronic communication device of FIG. 2;

FIG. 6B is a back view of the display assembly of FIG. 6A;

FIG. 6C is a side view of the display assembly of FIG. 6A;

FIG. 7 is an exploded side view of a housing of the handheld electronic communication device of FIG. 2;

FIG. 8 is a front view of a front housing member of the housing of FIG. 7;

FIG. 9 is a front view of a base of the housing of FIG. 7;

FIG. 15 illustrates an image having a landscape orientation and an image having portrait orientation.

DETAILED DESCRIPTION

Figure 1:
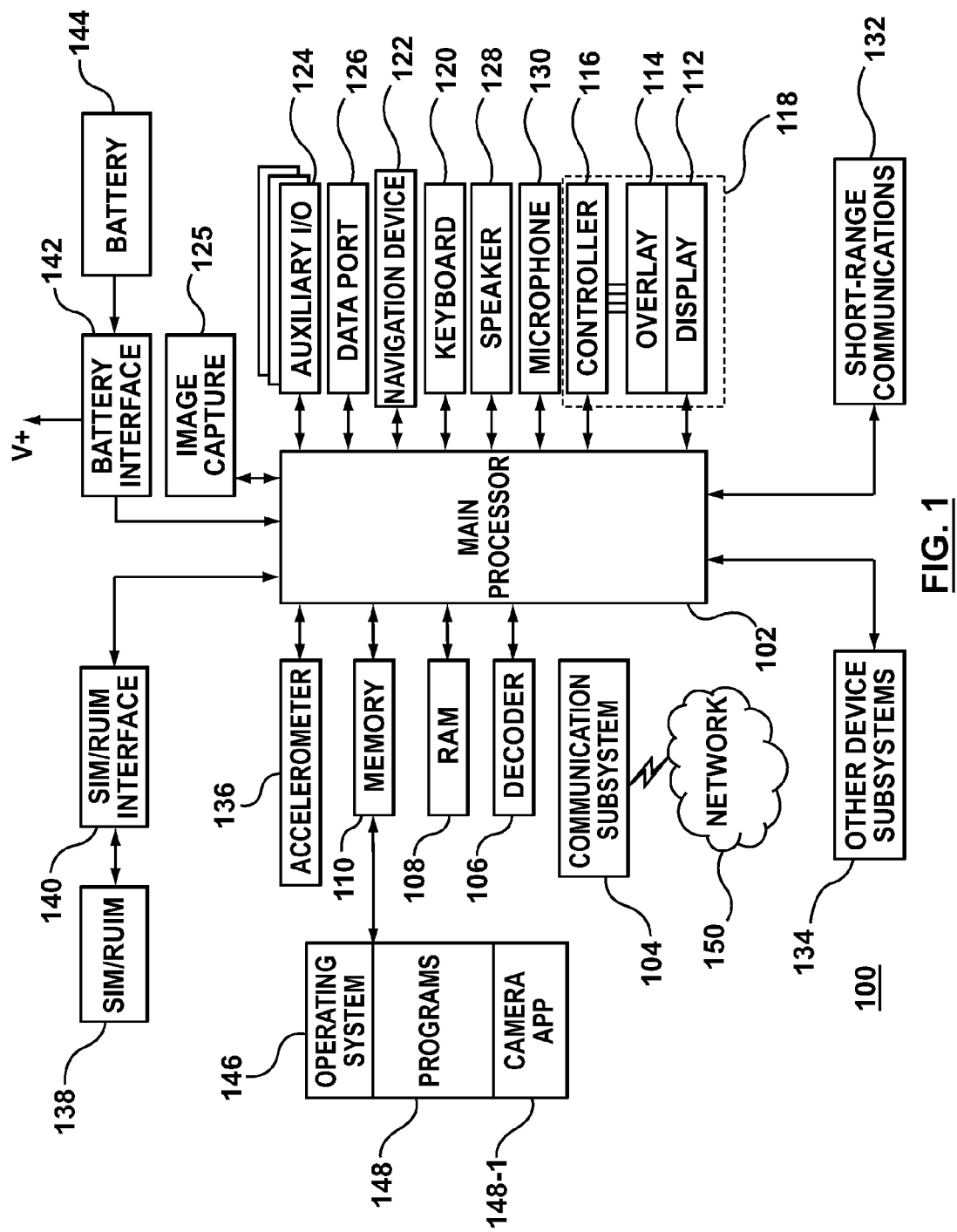
FIG. 1 is a simplified block diagram of components including internal components of a handheld electronic communication device according to an example embodiment.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limited to the scope of the example embodiments described herein.

According to one example is a handheld electronic device comprising: a housing; a display assembly movably mounted to the housing and comprising a display screen on a front face thereof, the display assembly being movable between a first position and a second position, wherein in the first position a first portion of the display screen is hidden from view by the housing and a second portion of the display screen is viewable, and in the second position the first portion and the second portion of the display screen are both viewable; an image sensor on at least one of the housing or the display assembly for receiving image data representing an image; a processor configured to control operation of the display screen and image sensor; at least one position sensor for providing display screen position information to the processor indicating if the display assembly is in the first position or the second position; and an orientation sensor for providing device orientation information to the processor indicating an orientation of the handheld electronic device; the processor being configured to store image data from the image sensor representing the image in an image file with image orientation information identifying a display orientation for the image, the image orientation information being determined in dependence on both the display screen position information and the device orientation information.

According to an example embodiment is a method of capturing image data using a handheld electronic device having a movable display screen, the movable display screen being movable between a first position and a second position, wherein in the first position a first portion of the display screen is hidden from view and a second portion of the display screen is viewable, and in the second position the first portion and the second portion of the display screen are viewable, the handheld electronic device having an image sensor, an orientation sensor for sensing an orientation of the handheld electronic device, and at least one position sensor for sensing a position of the display screen, comprising: receiving device orientation information from the orientation sensor and display screen position information from the position sensor; receiving image data from the image sensor representing an image; and determining an image orientation for the image in dependence on both the display screen position information and the device orientation information.

Referring first to FIG. 1, a block diagram of components of the handheld electronic communication device 100 is shown. The handheld electronic communication device 100 includes multiple components such as a processor 102 that controls the operations of the handheld electronic communication device 100. Communication functions, including data and voice communications, are performed through a communication subsystem 104. Data received by the handheld electronic communication device 100 is decompressed and decrypted by a decoder 106. The communication subsystem 104 receives messages from and sends messages to a wireless network 150. The wireless network 150 may be any type of wireless network, including, but not limited to, data-centric wireless networks, voice-centric wireless networks, and dual-mode networks that support both voice and data communications over the same physical base stations. In some examples, wireless network 150 is a conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX), or various other networks. In some examples, wireless network 150 includes a wireless network which, in some embodiments, conforms to IEEE 802.11x standards (sometimes referred to as Wi-H) such as, for example, one or more of the IEEE 802.11a, 802.11b, 802.11g and 802.11n standards. Other communication protocols may be used for the network 150 include for example IEEE 802.20 (also referred to as Mobile Wireless Broadband Access). In some examples communication subsystem 104 could include two or more communications subsystems for communicating with two or more different types of wireless networks—for example a wireless wide area network communication subsystem for EDGE or GPRS communications and a wireless local area network communication subsystem for Wi-H communications. The handheld electronic communication device 100 is a battery-powered device and includes a battery interface 142 for receiving one or more rechargeable batteries 144.

The processor 102 also interacts with additional subsystems such as a Random Access Memory (RAM) 108, a flash memory 110, a display 112 with a touch-sensitive overlay 114 connected to an electronic controller 116 that together comprise a touch-sensitive display 118, an input device such as keyboard 120, an optional navigation device 122, an auxiliary input/output (I/O) subsystem 124, an image capture device 125, a data port 126, a speaker 128, a microphone 130, short-range communications 132 (which for example could include a Bluetooth™ interface or infrared interface, among other things) and other device subsystems 134. User-interaction with the graphical user interface may be performed through the touch-sensitive overlay 114. The processor 102 interacts with the touch-sensitive overlay 114 via the electronic controller 116. Information, such as text, characters, symbols, images, icons, and other features that may be displayed or rendered on a handheld electronic communication device, are displayed on the touch-sensitive display 118 via the processor 102. Although the touch-sensitive display 118 is described as comprising a display 112 and an overlay 114, the touch-sensing components may overlay the display 112 or, alternatively, may be integrated into the display 112.

The processor 102 may also interact with an orientation sensor such as an accelerometer 136 as shown in FIG. 1. The accelerometer 136 may include a cantilever beam with a proof mass and suitable deflection sensing circuitry. The accelerometer 136 may be utilized for detecting direction of gravitational forces or gravity-induced reaction forces. The orientation sensor may also comprise a tilt sensor, an inclinometer, or any other device capable of sensing the orientation of the device.

Figure 13A:
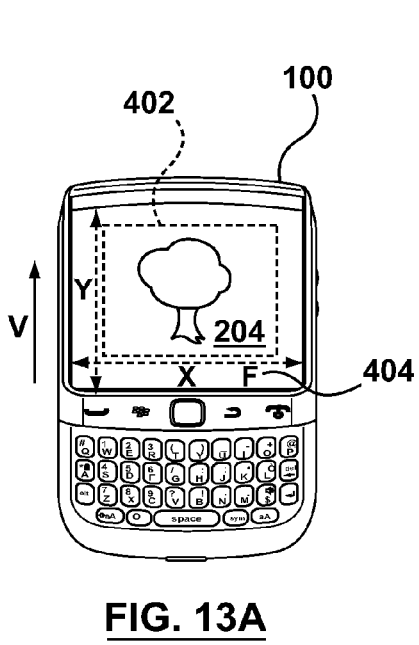
FIGS. 13A-F are front views of the handheld electronic communication device of FIG. 2 in different orientations and having the display assembly in different positions.
Figure 13B:
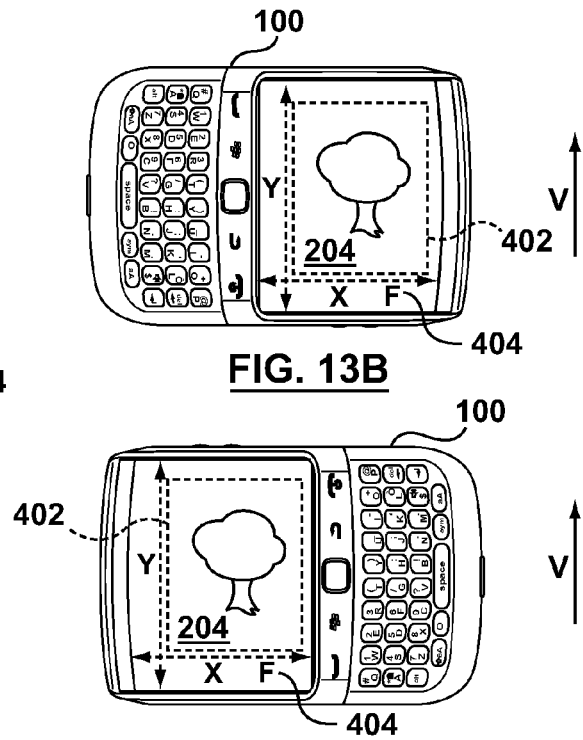
Figure 13C:
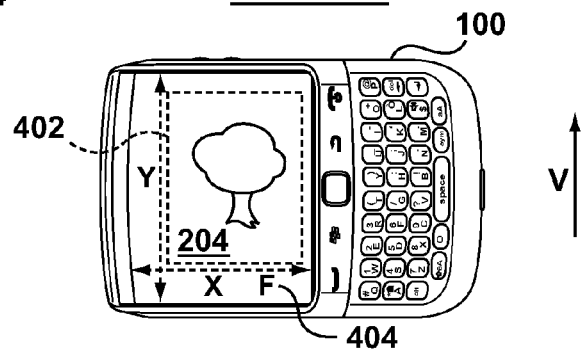
Figure 13D:
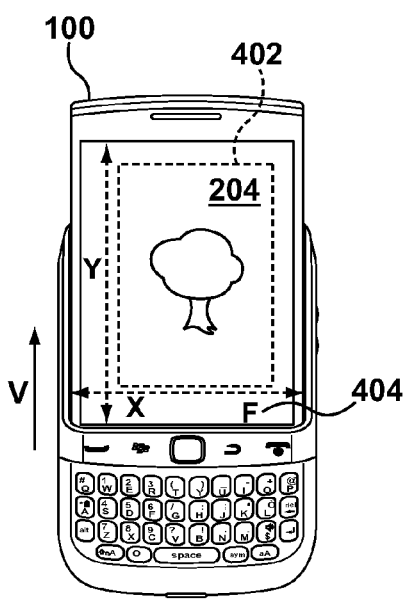

Information from the orientation sensor can be used to detect whether the device is in a vertical orientation as illustrated in FIGS. 13A and 13D, or in a horizontal orientation as illustrated in FIGS. 13B, 13C, 13E and 13F.

To identify a subscriber for network access according to the present embodiment, the handheld electronic communication device 100 uses a Subscriber Identity Module or a Removable User Identity Module (SIM/RUIM) card 138 inserted into a SIM/RUIM interface 140 for communication with a network such as the wireless network 150. Alternatively, user identification information may be programmed into the flash memory 110.

The handheld electronic communication device 100 also includes an operating system 146 and software components 148 that are executed by the processor 102 and are typically stored in a persistent store such as flash memory 110. Additional applications may be loaded onto the handheld electronic communication device 100 through the wireless network 150, the auxiliary I/O subsystem 124, the data port 126, the short-range communications subsystem 132, or any other suitable device subsystem 134.

In use, a received signal such as a text message, an e-mail message, or web page download is processed by the communication subsystem 104 and input to the processor 102. The processor 102 then processes the received signal for output to the display 112 or alternatively to the auxiliary I/O subsystem 124. A subscriber may also compose data items, such as e-mail messages, for example, which may be transmitted over the wireless network 150 through the communication subsystem 104. For voice communications, the overall operation of the handheld electronic communication device 100 is similar. The speaker 128 outputs audible information converted from electrical signals, and the microphone 130 converts audible information into electrical signals for processing.

Figure 10:
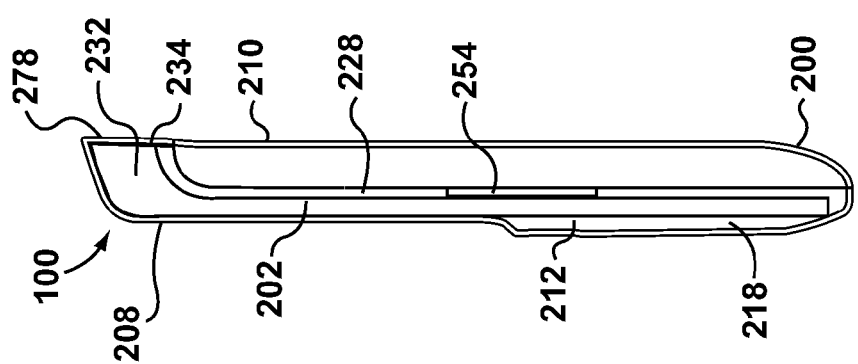
FIG. 10 is a schematic sectional view of the handheld electronic communication device of FIG. 2, taken along lines X-X of FIG. 4A.

Referring to FIGS. 2, 3, 4A-4D and 5A-5D views of an example of the handheld electronic communications device 100 are shown. The handheld electronic communication device 100 includes a housing 200 having a longitudinal axis and a sliding display screen assembly 202 that is mounted to the housing to slide axially between a first or retracted position as shown in FIGS. 2 and 4A-4D and a second or extended position as shown in FIGS. 3 and 5A-5D. The housing 200 includes a base 210 and a keyboard support member 224 in which a plurality of forward facing user input keys 216 of the keyboard 120 are disposed. A cavity 218, as best seen in sectional view of FIG. 10, and indicated by dashed reference line in FIGS. 2 and 3, is defined between a front surface of the base 210 and a back surface of the keyboard support member 224. The sliding display assembly 202 includes a display screen 204 (which in one example includes display 112 and touch sensitive overlay 114) on its front face. The display screen 204 has a first or lower portion 220 and a second or upper portion 222. When the display assembly 202 is in the retracted position as shown in FIG. 2, the lower portion 220 of the display screen 204 is received within the cavity 218 of housing 200 underlying the keyboard support member 224 such that the lower portion 220 is hidden from view, and the upper portion 222 of the display screen 204 extends from an open end of the cavity 218 and is exposed and viewable from a front of the device. When the display assembly 202 is in the extended position as shown in FIG. 3, the lower portion 220 of the display assembly is positioned out of the cavity 218 such that both the lower portion 220 and the upper portion 222 of the display screen 204 are viewable.

The sliding display assembly 202 may in at least some examples enable a compact size for the handheld electronic communication device 100 when the display assembly is retracted while providing a larger viewable display screen area when the display assembly is extended. The keyboard 120 is exposed and fully accessible from a front of the handheld electronic communication device 100 when the display assembly 202 is in both the retracted and extended positions.

The housing 200 and the display assembly 202 may both house components of the handheld electronic communication device 100, including the components described and shown in FIG. 1. Referring to FIGS. 6A-6C, an example of the display assembly 202 will now be explained in greater detail. The display assembly 202 has a first or lower terminal end 230 that is received within the housing cavity 218 at least when the display assembly 202 is in the retracted position, and a second or upper terminal end 232 at its opposite end. The display assembly 202 has a substantially planar front face 226 which includes a viewable surface of the display screen 204, an opposite facing back face 228 and longitudinal side edges 242 and 244. The back face 228 is substantially planar over most of the length of the display assembly 202, however the upper terminal end 232 defines an enlarged boss portion 234 that has a back face that is spaced further back from the display assembly front face 226 than the rest of the back face 228.

In example embodiments, image capture device 125 includes an image sensor 236. As can be seen in the retracted position back view of FIG. 4B, in some examples, the base 210 houses image sensor 236 such that the image sensor 236 faces outward from the back face of the base 210 for capturing one or both of photo or video image data. A flash or illuminator 238 may also be housed in the base 210 for illuminating objects that are the subject of image capture by the image sensor 236. The image capture device 125 may include one or more sub-processors for processing image data received through the image sensor 236.

Figure 12:
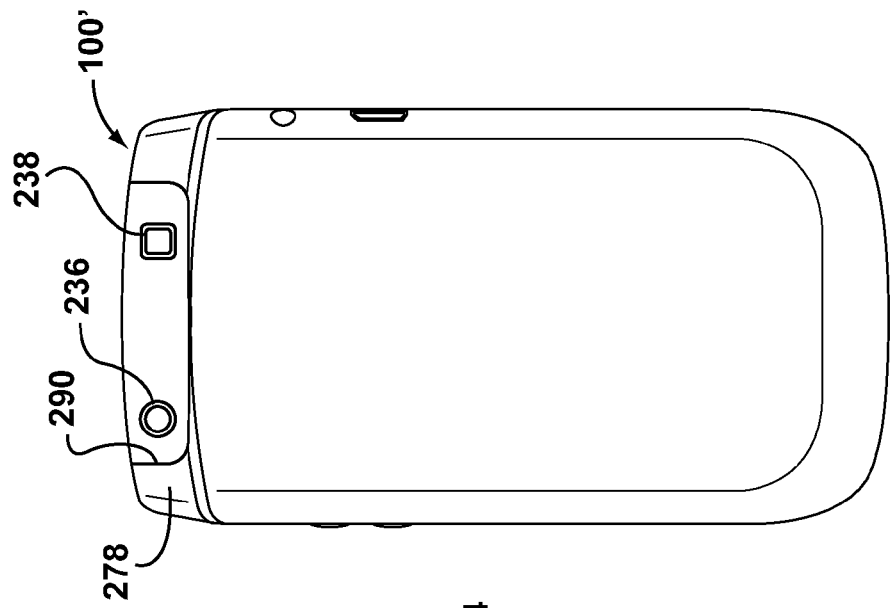
FIG. 12 is a back view of a further example of a handheld electronic communication device, showing the display assembly in the retracted position.

In other examples, as illustrated in FIG. 6B, the enlarged boss portion 234 houses the image sensor 236 and the optional illuminator 238. In this regard, FIG. 12 illustrates a back view of an example of handheld electronic communication device 100 where the back of housing 200 defines an opening 290 that exposes the image sensor 236 and illuminator 238 when the display assembly 202 is in its retracted position. The opening 290, which for example could be provided by omitting all or a portion of the cross member 278, facilitates the taking of picture and video when the display assembly 202 is in the retracted position.

The image sensor 236 is a device that captures optical images and converts them to an electrical signal in the form of image data. The image sensor 236 may comprise a charge-coupled device (CCD), a complementary metal-oxide semiconductor (CMOS) sensor, or any other sensor capable of capturing optical images.

Referring again to FIGS. 6A to 6C, in the illustrated example, device speaker 128 is housed in the enlarged boss portion 234 at the upper end 232 of the display assembly 202, and is oriented to output sound from the upper end 232 of the front face 226. In some examples, a sliding assembly member 240 is provided on the back face 228 of the display assembly 202 for slideably mounting the display assembly to a front face of the housing base 210.

Referring to FIGS. 7-9, an example of the housing 200 will now be explained in greater detail. As noted above, the housing 200 includes a base 210 and a keyboard support member 224. In one example, the keyboard support member 224 is part of a front housing unit 208. As shown in FIGS. 7 and 9, base 210 has substantially planar front face 252 with a first or lower section 246 and a second or upper section 248. The front face of the base lower section 246 is arranged in spaced opposition to the keyboard support member 224 to form cavity 218, and the base upper section 248 extends from the first section 246 beyond the open end of the cavity 218. The front face of upper section 248 faces the back face 228 of the display assembly 202. In some examples of handheld communication device 100, many of the components of the device shown in FIG. 1 are located within the base 210 including for example the main processor 102, RAM 108, memory 110, and communication subsystems 104 and 132. In one example, microphone 130 is located at a lower end of the base as illustrated in FIG. 9. An opening or slot 250 (see FIG. 8) may be provided in a lower end of the front housing unit 208 in alignment with the microphone 130. One or more antennas of one or both of the communications subsystem 104 and 132 may also be positioned at or near the lower end of the base 210. In some example embodiments, one or more data ports 126 and auxiliary I/O interfaces 124 can be provided on side edges of the base 210. For example, as seen in FIG. 4D, a data port 126 in the form of a USB port and an I/O interface 124 in the form of an audio/microphone jack are provided on a side edge of the upper section of base 210. As seen in FIG. 4C, physical user input buttons such as volume control buttons 253 that are operatively connected to the processor 102 can also be located on side edges of the base 210.

Referring again to FIG. 9, a slider assembly member 254 can be provided on the front face 252 of the base 210. The slider assembly member 254 of the base 210 cooperates with the slider assembly member 240 of the sliding display assembly 202 to collectively provide a sliding assembly 256 (FIG. 10) that slideably connects the display assembly 202 to the base 210. Any different number of known sliding assembly configurations could be used to implement sliding assembly 256, including but not limited to slider assemblies that incorporate one or both of springs and or electric motors to assist in moving the sliding component and retaining the sliding component in a desired position. In at least some examples a flex connector 260 extends between the base 210 and the sliding assembly 256 to provide an electrical link between components housed within the display assembly 202 and components housed within the base 210. In some example configurations, other communications links could be provided between base components and display assembly components, including for example optical or RF links.

One or more position sensors 258 can be provided on the base 210 or the display assembly 202 for detecting the position of the display assembly 202 relative to the housing 200. For example, a Hall effect sensor may be utilized to detect a position or positions of the display assembly 202 relative to the housing 200. According to another example, a mechanical switch or switches are used.

With reference to FIGS. 7 and 8, the keyboard support member 224 forms a lower portion of front housing unit 208 and supports keyboard 120. In one example, keyboard 120 includes a plurality of depressible alphanumeric keys 216 which may be arranged in rows and columns with a standard keyboard layout (e.g. QWERT, DVORAK, etc.). In some examples, the keyboard 120 may include a respective dome switch associated with each of the keys 216, however many different keyboard configurations could be used to implement keyboard 120.

In one example embodiment, a number of function keys 282 and a navigation device 122 are provided in a row along on the keyboard support member 120 between the keyboard 120 and the display screen. Function keys 282 are operatively connected to the processor 102 to initiate predetermined device functions such as initiate a phone call, terminate a phone call, and return to previous screen, among other things. The navigation device 122 responds to user interaction and can be used for navigating around the display screen 204, to select objects on the display screen 204 and for other purposes. The navigation device 122 can act as a cursor navigational tool and in some examples, the navigation device 122 can consist of an optically based user input device such as an optical joystick that uses an optical sensor pad 206 to detect relative movements of a finger. The optically based navigation device 122 can be used to instruct two-dimensional screen cursor movement in substantially any direction, as well as act as an actuator when the optically based navigation device 122 is depressed like a button. In some examples, where an optical sensor pad is used to implement navigation device 122, the optical sensor pad has a low profile so that it is generally flush with the front of the keyboard support member 224 and does not protrude extensively behind the keyboard support member. In some examples, navigation device 122 could alternatively be a trackball, touchpad, physical joystick, directional keys or key pad.

In an example, the front housing unit 208 includes opposed first and second sidewalls 264 and 266 that extend from the keyboard support member 224 along respective axial side edges of the upper section 248 of base 210. At the upper end of the housing unit, the sidewalls 264 and 266 are connected by a cross member 278. The cross member 278, sidewalls 264 and 266 and keyboard support member 224 collectively define a rectangular opening 280 through which the display assembly 202 can be viewed. Referring to the sectional view of FIG. 11, in one example sidewalls 264 and 266 each protrude away from the front face 252 of base 210 so that the screen assembly 202 is located between the sidewalls 264 and 266. As can be seen in FIG. 4A, when the screen assembly 202 is in its retracted position, the upper portion 222 of the display screen 204 is located between sidewalls 264 and 266 with the side edges of the screen assembly 202 concealed by sidewalls 264 and 266. In the extended position, as seen in FIG. 5A, at least part of the upper portion 222 of the display screen extends beyond the upper ends of the sidewalls 264.

Figure 11:
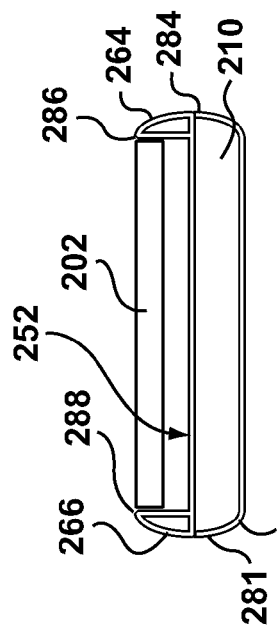
FIG. 11 is a schematic sectional view of the handheld electronic communication device of FIG. 2, taken along lines XI-XI of FIG. 4B.

Referring again to the sectional view of FIG. 11, in one example, an outer surface of the sidewall 266 together with an outer side edge surface 281 of the base 210 forms one side edge of the communication device 100 and an outer surface of the sidewall 264 together with an outer side edge surface 284 of the base 210 forms an opposite side edge of the communication device 100. In one example, along the sides of rectangular opening 280 (FIG. 8) the terminal edges 286, 288 of the sidewalls 264, 266 that face away from the front surface 252 of the base 210 are located in plane that is slightly higher than a front viewing surface of the display screen 204. In another example, along the sides of rectangular opening 280 the terminal edges 286, 288 of the sidewalls 264, 266 that face away from the front surface 252 of the base 210 are located in plane that is substantially flush with a front viewing surface of the display screen 204.

Referring again to FIGS. 7, 8 and 10, in one example the cross member 278 that extends between the upper ends of the sidewalls 264, 266 is offset back towards the base 210 relative to the sidewalls 264, 266 such that the cross member 278 is located behind the back face of the enlarged boss portion 234 of the upper end 232 of the display assembly 202. In such an example, the cross member 278 forms the upper terminal end of the housing 200 and provides a recess in the housing 200 for receiving the enlarged display assembly boss portion 234 when the display assembly is in its retracted position. As seen in FIGS. 4C and 4B, when the display assembly 202 is in its retracted position its upper end 232 is coterminous with the upper end of the housing 200 such that the housing 200 covers substantially the entire back surface of the display assembly 202.

In one example, the sidewalls 264, 268 protect the side edges of the display assembly 202 when the display assembly is in its retracted position, and also provide opposed surfaces for gripping the handheld electronic communication device 100 between the palm and fingers of a hand without interfering with movement of the display assembly. In one embodiment the sidewalls 264, 268 are respectively spaced apart such that a user can grip one side edge of the communication device 100 with fingers of a hand, grip the opposite side edge with the palm of the same hand and have the thumb free to either extend or retract the display assembly 202 or actuate the navigation device 122.

As indicated above the communication device 100 may include one or more sensors 258 that indicate one or more relative positions of the display assembly 200 to the processor 102. In examples the processor 102 is configured to modify operational characteristics of the display screen 204 in dependence on the sensed position of display assembly 200. By way of example, where the display screen 204 is an OLED (organic light emitting diode) display having pixels that can be selectively illuminated, when the processor 102 detects that the display assembly 204 is retracted the processor 102 can disable the illumination of pixels that are in the portion of the display screen 204 that is received within recess 218, while still enabling illumination the pixels of upper display screen portion 222. Such a feature may allow power conservation.

The operation of a handheld communication device 100 to capture and store image data will now be described in greater detail according to example embodiments. In an example embodiment, the operation and functionality of the image capture device 125 and its associated image sensor 236 is controlled by processor 102 operating under instructions from a camera application 148-1 that is included among software programs 148. In example embodiments, the camera application 148-1 enables the handheld electronic device 100 to operate in an image capturing mode or camera mode in which image data received through the image sensor 236 is displayed on display screen 204 and, upon occurrence of a image capture trigger, an image file derived from the received image data is created and stored as an image file in persistent memory such as memory 110 or a memory card inserted into a memory card interface of the handheld electronic device 100.

By way of example, the handheld electronic device 100 may be configured to enter a camera mode when a predetermined user input is received such as user selection of a physical camera mode enabling button (for example one of side edge buttons 253) or a predetermined soft button or icon is selected on display screen 204. Once in camera mode, real time-image data as received through the image sensor 236 is continually displayed on the display screen 204 so that the user can preview or observe in real-time an image that represents the image data being received by image sensor 204. Upon occurrence of an image capture trigger, the image data received through the image sensor 236 at the time that the image capture trigger occurs is captured, processed and stored as an image file on the handheld communications device 100. The image data stored in the image file may be an encoded, compressed or otherwise processed version of the image data received by the image sensor 236. In various examples, the stored image file may be, among other things, a TIF, JPG, PNG or GIF file. The image data may also be stored in a raw image format to minimize processing and to preserve image fidelity. The image capture trigger could for example include a predetermined user input—for example activation of navigation device 122 or pressing of a predetermined side edge button 253, or user selection of a predetermined soft button or icon on display screen 204. In some cases the image capture trigger could include a predetermined user input followed by a predetermined delay.

As known, captured images such as pictures often are displayed in a rectangular format having height and a width, with the height generally corresponding to the vertical orientation of the captured image. Captured images in which the height is greater than the width are commonly referred to as having a "portrait" orientation, and captured images in which the width is greater than the height are commonly referred to as having a "landscape" orientation. In this regard, FIG. 15 illustrates representative rectangular images 615, 625 that show a tree, with image 615 having a landscape orientation and image 625 having a portrait orientation. Image data files can include orientation information that identifies an orientation of the image data so that a display device will display the resulting image with the correct orientation.

Example embodiments are described herein in which the handheld electronic device 100 is configured to selectively capture image data in a landscape or portrait orientation not only in dependence on the orientation of the handheld electronic device 100 but also in dependence on whether the display screen 204 is in its extended or retracted position.

Figure 13E:
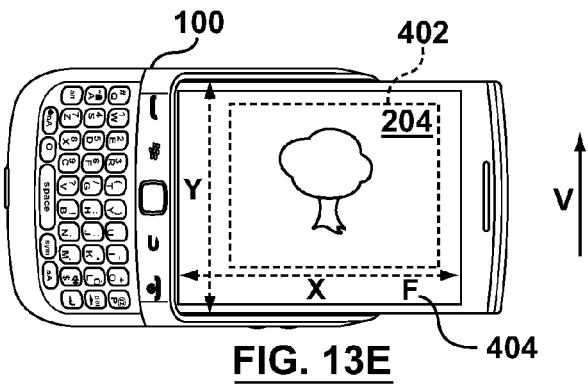
Figure 13F:
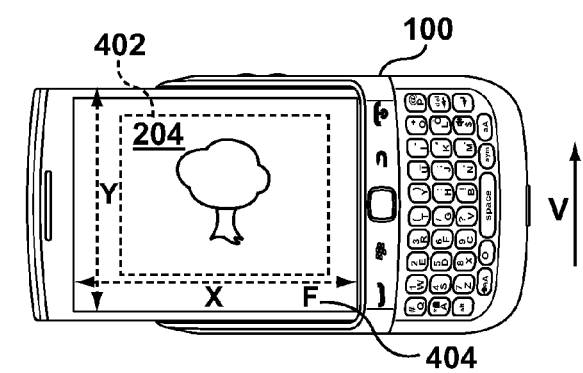

FIGS. 13A to 13F which illustrate six possible orientation and display screen position combinations that correspond to six different image capture modes for a handheld electronic device 100 having a sliding display screen 204, with line V representing the vertical. FIGS. 13A and 13D show the handheld electronic device vertically orientated with the display screen 204 retracted and extended, respectively. FIGS. 13B and 13E show the handheld electronic device horizontally oriented, left side edge up, with the display screen 204 retracted and extended, respectively. FIGS. 13C and 13F show the handheld electronic device horizontally oriented, right side edge up, with the display screen 204 retracted and extended, respectively.

The combination of a vertical orientation and retracted display screen 204 shown in FIG. 13A provides the visible display screen portion with a width X that is greater than its height Y, such that from a user's perspective the intuitive picture orientation for an image captured while the device is in the vertical orientation retracted display screen position of FIG. 13A would be a landscape orientation. The combination of a vertical orientation and extended display screen shown in FIG. 13D provides the visible display screen portion with a height Y that is greater than its width X, such that from a user's perspective the intuitive picture orientation for an image captured while the device is in the position of FIG. 13D would be a portrait orientation. The combination of a horizontal orientation and retracted display screen shown in FIGS. 13B and 13C provides the visible display screen portion with a height Y that is greater than its width X, such that from a user's perspective the intuitive picture orientation for an image captured while the device is in the position of FIG. 13B or 13C would be a portrait orientation. The combination of a horizontal orientation and extended display screen shown in FIGS. 13E and 13F provides the visible display screen portion with a width X that is greater than its height Y, such that from a user's perspective the intuitive picture orientation for an image captured while the device is in the position of FIG. 13E or 13F would be a landscape orientation.

Figure 14:
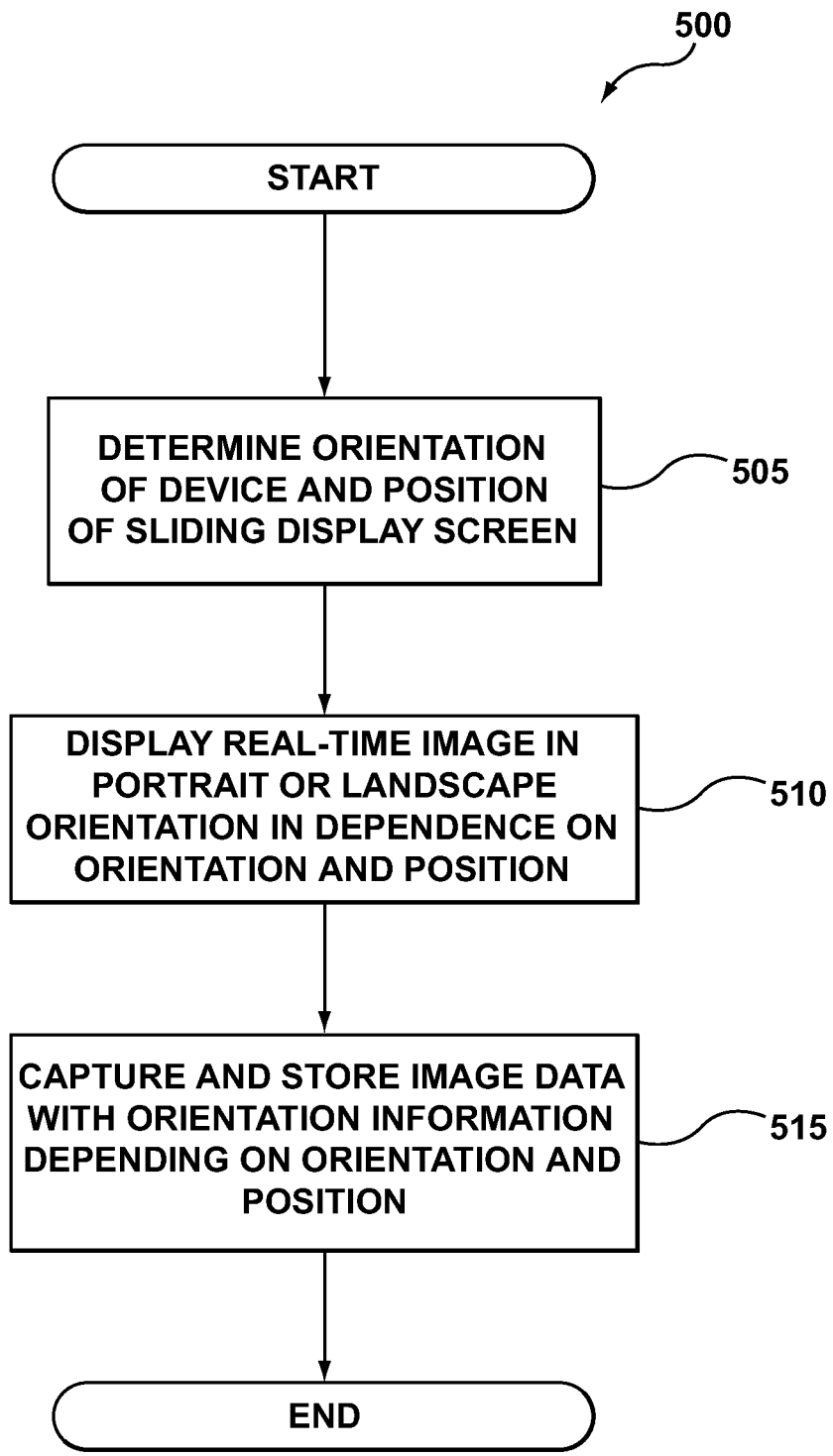
FIG. 14 is a flowchart illustrating an example of a method of capturing image data using a handheld electronic device having a sliding display and an image sensor.

Referring to FIG. 14, an example method 500 of receiving and capturing image data through image sensor 236 on a handheld electronic device 100 having a sliding display assembly will now be explained in greater detail. In an example embodiment, the method 500 commences once the handheld electronic device 100 enters a camera mode in the manner described above. As indicated in action 505, while in camera mode the processor 102 is configured to continuously monitor the orientation of the handheld electronic device 100 and the position of the sliding display screen 204. In example embodiments, the device orientation is determined based on device orientation information from an orientation sensor such as accelerometer 136. In one example, the processor 102 can determine the orientation of the device 100 by interpreting the direction of gravitational forces sensed by the accelerometer 136 with respect to the device 100.

In example embodiments, the processor 102 determines the position of the display assembly 202 (and display screen 204) relative to the housing 200 from display assembly or display screen position information from the one or more position sensors 258. The processor is configured to determine whether the display screen 204 is in a retracted position as illustrated in FIGS. 13A-C, or an extended position as illustrated in FIGS. 13D-F.

During use, the handheld electronic device 100 will often be positioned at angles that are not perfectly vertical or horizontal directions and accordingly in example embodiments a device orientation corresponding to one of the orientations shown in FIGS. 13A to 13F is determined based on the sensed orientation having characteristics that indicate which of the positions shown in FIGS. 13A to 13F the handheld electronic device approximates or is closest to being in. By way of non-limiting example, when the handheld electronic device is in the vertical orientation of FIG. 13A, rotating the device by a threshold amount or more (for example 30 degrees to the horizontal) towards the horizontal position in FIG. 13C will result in the device determining that it is in the horizontal orientation of FIG. 13C, resulting in a shift from a portrait image orientation to a landscape image orientation when the threshold is reached. Similarly, when the handheld electronic device is in the horizontal orientation of FIG. 13C, rotating the device by a threshold amount or more (for example 60 degrees to the vertical) towards the vertical position in FIG. 13A will result in the device determining that it is in the vertical orientation of FIG. 13A, resulting in a shift from a landscape image orientation to a portrait image orientation. Accordingly, in some example embodiments a change in orientation is detected when the device orientation changes a threshold amount from a current position. Different thresholds could be applied for determining the shift to different orientations.

As indicated in action 510, a real-time image representing the image data received by the image sensor 236 is displayed on the display screen 204 in either a landscape or portrait orientation in dependence on the currently sensed orientation and display screen position. In particular, based on the sensed orientation and display screen position information, the processor 102 determines which one of the six possible orientation and display screen position combinations shown in FIGS. 13A-13F the handheld electronic device 100 is currently in and then displays information on the display screen 204 according to a corresponding image capture mode. By way of example, FIG. 13A corresponds to a vertical device orientation, display screen retracted mode, and based on thus real-time image data from the image sensor 236 is shown on the display screen 204 in a landscape orientation. In some examples, a rectangular onscreen indicator such as rectangular box 402 is displayed on the display screen 204 to provide a visual indication that the image data is displayed in a landscape or portrait orientation (landscape orientation being indicated by indicator 402 in FIG. 13A). In some embodiments, the onscreen indicator box 402 may only appear overlaying image data momentarily when pre-image capture trigger occurs such as initial user selection of camera button on the device. In some embodiments the onscreen indicator box 402 may be an outer border that frames the image data to provide a visual indication of what image data will be stored in a corresponding image file when a image capture trigger occurs.

FIG. 13B corresponds to a horizontal/left edge vertical device orientation, display screen retracted mode, and based on that real-time image data from the image sensor 236 is shown on the display screen 204 in a portrait orientation. Similarly, FIG. 13C corresponds to a horizontal/right edge vertical device orientation, display screen retracted mode, and based on that real-time image data from the image sensor 236 is shown on the display screen 204 in a portrait orientation.

FIG. 13D corresponds to a vertical device orientation, display screen extended mode, and based on that real-time image data from the image sensor 236 is shown on the display screen 204 in a portrait orientation. FIG. 13E corresponds to a horizontal/left edge vertical device orientation, display screen extended mode, and based on that real-time image data from the image sensor 236 is shown on the display screen 204 in a landscape orientation. Similarly, FIG. 13F corresponds to a horizontal/right edge vertical device orientation, display screen extended mode, and based on that real-time image data from the image sensor 236 is shown on the display screen 204 in a landscape orientation.

In some examples, status or other information can be presented on the display screen 204 in camera mode—for example, in FIGS. 13A to 13F, on onscreen symbol shown as an "F" 404 indicates that the flash or illuminator 238 is enabled. The display orientation of this status or other information may also be selected based on the sensed orientation of the handheld electronic device 100.

In the vertical device orientation, retracted display screen mode of FIG. 13A and the vertical device orientation, extended display screen mode of FIG. 13D the orientation of image sensor 236 remains the same for capturing, respectively, landscape oriented images and portrait oriented images. Similarly, in the horizontal device orientations of FIGS. 13B, 13C, 13E and 13F the orientation of image sensor 236 remains the same for capturing landscape oriented images and portrait oriented images. Accordingly, in order to maintain the correct aspect ratio and resolution between different image capture modes, in some example embodiments, different subsets of pixel data received from the image sensor may be selected for display on the display screen 204 and for image data capture and storage in dependence on the image capture mode.

Figure 16:
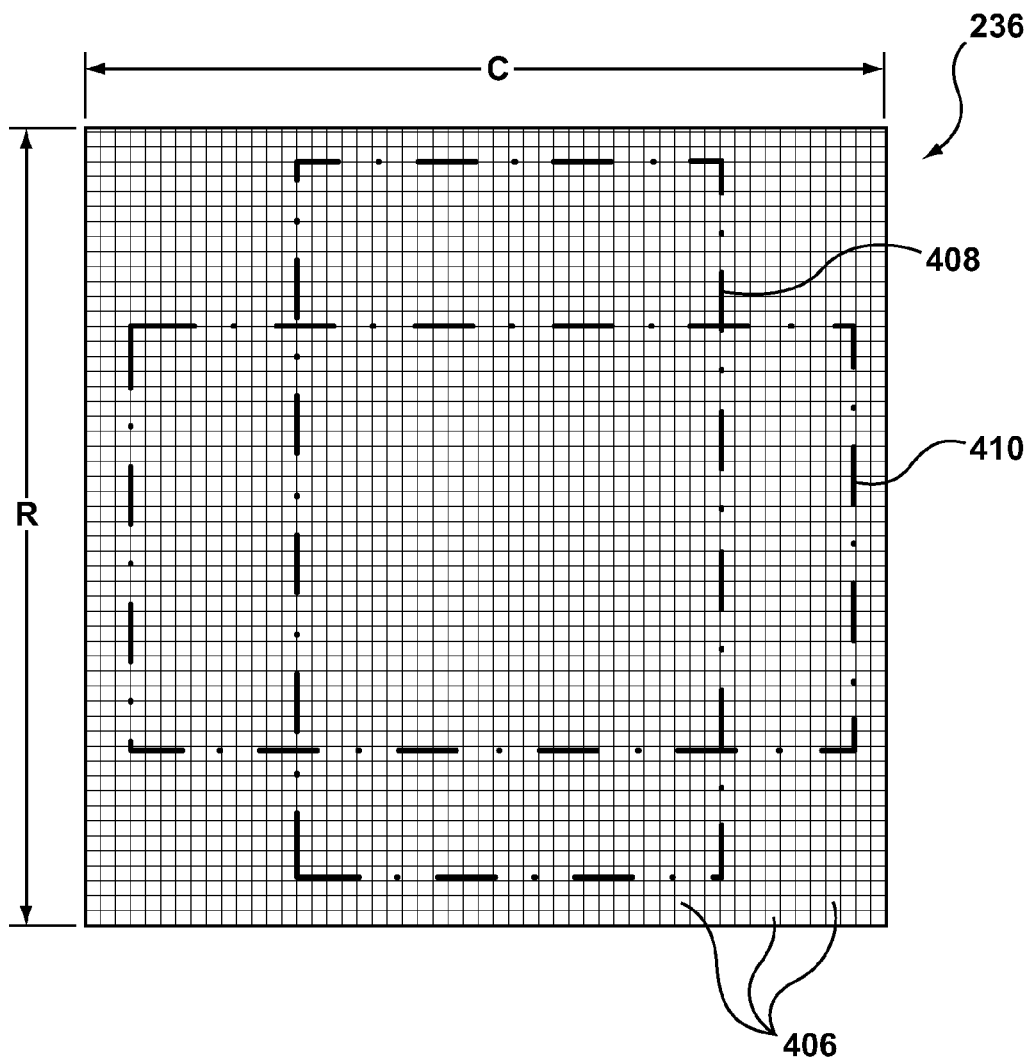
FIG. 16 illustrates pixels of an image sensor.

By way of example, FIG. 16 represents the columns "C" and rows "R" of pixels 406 that the image sensor 236 is capable of capturing. When in the vertical device orientation, retracted display screen capture mode of FIG. 13A, the landscape image displayed on display screen 204 corresponds to data received from pixel subset 410, whereas in the vertical device orientation, extended display screen capture mode of FIG. 13D, the portrait image displayed on display screen 204 corresponds to data received from pixel subset 408. Similarly in the horizontal device orientation, retracted screen modes of FIGS. 13B and 13C, the portrait image displayed on display screen 204 corresponds to data received from pixel subset 410, and in the horizontal device orientation, extended display screen modes of FIGS. 13E and 13F, the landscape image on displayed on display screen 204 corresponds to data received from pixel subset 408.

Turning again to FIG. 14, as indicted at action 515, when a predetermined image capture trigger occurs (for example a predetermined user input action occurs), image data received through the image sensor 236 is captured, processed and stored as an image file with image orientation information depending on the device orientation and the display screen position. In particular, the image file includes image orientation information for the captured image that corresponds to the image capture mode the mobile electronic device was in at the time that the image data was captured. The image orientation information includes information required to permit the image represented by the image data in the image file to be subsequently automatically displayed by a viewing device (which could for example be handheld electronic device 100 or another viewing device or medium) in the landscape or portrait orientation with the correct vertical orientation that corresponds to the orientation in which the subject image was originally captured. Thus, the image orientation information identifies an intended display orientation for the image represented by the stored image data. For example, the image file stored for each of the three image capture modes represented in FIGS. 13A, 13E and 13F will include orientation information such that a display device reading the image file can automatically display the image in the correct landscape orientation 615 as shown in FIG. 15. Similarly, the image file stored for each of the three image capture modes represented in FIGS. 13D, 13B and 13C will include image orientation information such that a display device reading the image file can automatically display the image in the correct portrait orientation 625 as shown in FIG. 15.

Image file formats typically include a representation of pixel information to allow an image to be replicated at a pixel level. In some example embodiments, the format of the pixel data contained in an image file can inherently include orientation information—for example the pixel data may be represented as rows and columns with a top of the image starting at the top of the array, with a greater number of columns than rows identifying a landscape orientation and a greater number of rows than columns identifying a portrait orientation. In such examples, the processor 102 is configured to rotate and store the image data received through sensor 236 in the correct orientation in the resulting data file. In some example embodiments, the orientation may not be inherent in the pixel data format and instead orientation information may be included by the processor 102 as metadata or a tag or header information stored with the pixel data in an image file, with the orientation information identifying if the image is landscape or portrait and the top of the image. In some examples a combination of the pixel data format and accompanying information may be used to identify the orientation of the image data.

In the example illustrated on FIGS. 13A to 13F, six different orientation and display screen position combinations corresponding to six different image capture modes are illustrated. In other example embodiments, more or fewer that six image capture modes are possible. For example, in some embodiments the handheld electronic device 100 could be configured to always shoot in a portrait orientation when device is vertically oriented regardless of whether the screen position was extended or retracted, but to still toggle between portrait and landscape orientation when the device was horizontal and the display screen moved between retracted and extended positions.

In some examples, the processor 102 may be configured to change the resolution, angle, focus or dimensions of the image data captured by the image sensor 236 based on the orientation of the device and the position of the display screen. For example, when the device is in a horizontal orientation and the screen is extended as shown in FIGS. 13E and 13F, the processor 102 may be configured to capture and store a wider-angle landscape image than is captured and stored when the device is in the vertical orientation/retracted screen position of FIG. 13A.

While the examples described above have been directed at capturing and storing images, they could equally apply to devices and methods for capturing video on a handheld electronic device having a sliding display. The examples could also be applied to other forms of portable electronic devices having movable screens, including portable electronic devices having rotating or pivoting display screens in which the screen is partially hidden in a first position (for example a retracted position) and fully exposed in a second position (for example an extended position).

In some example embodiments, rather than or in addition to storing the image files with image orientation information at persistent memory 110 or a memory card inserted into the handheld electronic device 100, the processor 102 may cause the image files with image orientation information to be remotely stored by sending the image file to a remote storage location over communication subsystem 104 or sort-range communications subsystem 132.

In some examples processor 102 can comprise multiple coordinated processors.

While the present disclosure is described primarily in terms of methods, the present disclosure is also directed to a portable electronic device configured to perform at least part of the methods. The portable electronic device may be configured using hardware modules, software modules, a combination of hardware and software modules, or any other suitable manner. The present disclosure is also directed to a pre-recorded storage device or computer-readable medium having computer-readable code stored thereon, the computer-readable code being executable by at least one processor of the portable electronic device for performing at least parts of the described methods.

While the examples described herein are directed to particular implementations of the handheld electronic communication device it will be understood that modifications and variations may occur to those skilled in the art having had the benefit of this disclosure.

What is claimed is:

1. A handheld electronic device comprising:
   a housing;
   a display assembly movably mounted to the housing and comprising a display screen on a front face thereof, the display assembly being movable between a first position and a second position, wherein in the first position a first portion of the display screen is hidden from view by the housing and a second portion of the display screen is viewable, and in the second position the first portion and the second portion of the display screen are both viewable;
   an image sensor on at least one of the housing or the display assembly for receiving image data representing an image;
   a processor configured to control operation of the display screen and image sensor;
   at least one position sensor for providing display screen position information to the processor indicating if the display assembly is in the first position or the second position; and
   an orientation sensor for providing device orientation information to the processor indicating an orientation of the handheld electronic device;
   the processor being configured to:
   store image data from the image sensor representing the image in an image file with image orientation information identifying an image orientation for the image, the image orientation information being determined in dependence on both the display screen position information and the device orientation information;
   the image orientation information identifying a portrait orientation when the device orientation information indicates that the handheld electronic device is in a vertically oriented position and the display screen position information indicates that the display assembly is in the second position;
   the image orientation information identifying a landscape orientation when the device orientation information indicates that the handheld electronic device is in a vertically oriented position and the display screen position information indicates that the display assembly is in the first position;
   the image orientation information identifying a landscape orientation when the device orientation information indicates that the handheld electronic device is in a horizontally oriented position and the display screen position information indicates that the display assembly is in the second position; and
   the image orientation information identifying a portrait orientation when the device orientation information indicates that the handheld electronic device is in a horizontally oriented position and the display screen position information indicates that the display assembly is in the first position.

2. The handheld electronic device of claim 1 wherein the image data stored in the image file includes pixel data and the image orientation information is represented in the format of the pixel data.

3. The handheld electronic device of claim 2 wherein the processor is configured to rotate the pixel data for storage in the image file in dependence on both the display screen position information and the device orientation information.

4. The handheld device of claim 1 wherein the image file includes the image orientation information as metadata.

5. The handheld electronic device of claim 1 wherein the image sensor senses rows and columns of pixels, wherein the image data is derived from different subsets of pixels in dependence on both the display screen position information and the device orientation information.

6. The handheld electronic device of claim 1 wherein the processor is configured to display a real-time image on the display screen representing the image data received through the image sensor, wherein the real-time image is selectively displayed in either a landscape orientation or a portrait orientation depending on both the display screen position information and the device orientation information.

7. The handheld electronic device of claim 6 wherein the processor is configured to display an on-screen indicator with the real-time image to indicate if the real-time image is displayed in a landscape orientation or a portrait orientation.

8. The handheld electronic device of claim 6 wherein the processor is configured such that:
  if the device orientation information and display screen position information indicate that the handheld electronic device is in a horizontally oriented position with the display assembly in the second position, the real-time image is displayed in a landscape orientation; and
  if the device orientation information and display screen position information indicate that the handheld electronic device is in a horizontally oriented position with the display assembly in the first position, the real-time image is displayed in a portrait orientation.

9. The handheld electronic device of claim 1, wherein the processor is further configured to:
  capture the image; and
  receive the device orientation information and the display screen position information at the time of capturing the image.

10. The handheld electronic device of claim 6 wherein the real-time image is selectively displayed in the landscape orientation or the portrait orientation in accordance with the image orientation information.

11. A method of capturing image data using a handheld electronic device having a movable display screen, the movable display screen being movable between a first position and a second position, wherein in the first position a first portion of the display screen is hidden from view and a second portion of the display screen is viewable, and in the second position the first portion and the second portion of the display screen are viewable, the handheld electronic device having an image sensor, an orientation sensor for sensing an orientation of the handheld electronic device, and at least one position sensor for sensing a position of the display screen, comprising:
  receiving device orientation information from the orientation sensor and display screen position information from the position sensor;
  receiving image data from the image sensor representing an image; and
  determining an image orientation for the image in dependence on both the display screen position information and the device orientation information;
  the image orientation being determined to be a portrait orientation when the device orientation information indicates that the handheld electronic device is in a vertically oriented position and the display screen position information indicates that the display screen is in the second position;
  the image orientation being determined to be a landscape orientation when the device orientation information indicates that the handheld electronic device is in a vertically oriented position and the display screen position information indicates that the display screen is in the first position;
  the image orientation being determined to be a landscape orientation when the device orientation information indicates that the handheld electronic device is in a horizontally oriented position and the display screen position information indicates that the display screen is in the second position; and
  the image orientation being determined to be a portrait orientation when the device orientation information indicates that the handheld electronic device is in a horizontally oriented position and the display screen position information indicates that the display screen is in the first position.

12. The method of claim 11 comprising storing an image file representing the image, the image file including information identifying the determined image orientation, wherein the determined image orientation represents an intended display orientation for the image.

13. The method of claim 12 wherein the image is represented with pixel data and the pixel data is formatted in the image file in dependence on the determined image orientation.

14. The method of claim 11 wherein the image sensor senses rows and columns of pixels, the method comprising deriving the image data from different subsets of pixels in dependence on the determined image orientation.

15. The method of claim 11 comprising displaying a real-time image on the display screen representing the image in either a landscape orientation or a portrait orientation depending on the determined image orientation.

16. The method of claim 15 comprising displaying an on-screen indicator with the real-time image to indicate if the real-time image is presented in a landscape orientation or a portrait orientation.

17. The method of claim 15 wherein:
  if the device orientation information and display screen position information indicate that the handheld electronic device is in a horizontally oriented position with the display screen in the second position, displaying the real-time image with a landscape orientation; and
  if the device orientation information and display screen position information indicate that the handheld electronic device is in a horizontally oriented position with the display screen in the first position, displaying the real-time image with a portrait orientation.

18. A computer program product comprising a non-transitory computer readable medium having stored thereon computer code for causing a handheld electronic device to carry out the method of claim 11.

19. The method of claim 11, further comprising capturing the image, wherein the device orientation information and the display screen position information are received from the orientation sensor and the position sensor, respectively, at the time of capturing the image.

* * * * *